(12) United States Patent
Xiong et al.

(10) Patent No.: US 11,827,000 B2
(45) Date of Patent: Nov. 28, 2023

(54) AUXILIARY MARKING TAPE LAYING VEHICLE FOR LASER SCANNING OF THE MORPHOLOGY OF LONG-SPAN BRIDGE

(71) Applicant: SOUTHEAST UNIVERSITY, Nanjing (CN)

(72) Inventors: Wen Xiong, Nanjing (CN); Haowen Xu, Nanjing (CN); Chang Xu, Nanjing (CN); Yanjie Zhu, Nanjing (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 0 days.

(21) Appl. No.: 18/009,620

(22) PCT Filed: Jan. 7, 2022

(86) PCT No.: PCT/CN2022/070712
§ 371 (c)(1),
(2) Date: Dec. 9, 2022

(87) PCT Pub. No.: WO2023/108845
PCT Pub. Date: Jun. 22, 2023

(65) Prior Publication Data
US 2023/0211596 A1 Jul. 6, 2023

(30) Foreign Application Priority Data
Dec. 17, 2021 (CN) .......................... 202111549499.8

(51) Int. Cl.
*B32B 41/00* (2006.01)
*B32B 37/00* (2006.01)

(52) U.S. Cl.
CPC .......... *B32B 41/00* (2013.01); *B32B 37/0053* (2013.01)

(58) Field of Classification Search
CPC ........................... B32B 41/00; B32B 37/0053
(Continued)

(56) References Cited

U.S. PATENT DOCUMENTS

2019/0078276 A1* 3/2019 Wilkens ................ E01C 23/185

FOREIGN PATENT DOCUMENTS

| CN | 102677611 A | 9/2012 |
| CN | 203173699 U | 9/2013 |

(Continued)

*Primary Examiner* — Michael N Orlando
*Assistant Examiner* — Joshel Rivera
(74) *Attorney, Agent, or Firm* — Muncy, Geissler, Olds & Lowe, P.C.

(57) ABSTRACT

Disclosed in the present invention is an auxiliary marking tape laying vehicle for laser scanning of the morphology of a long-span bridge, the laying vehicle comprising a laying portion, a guiding portion and a power transmission portion, wherein the laying portion is fixed on the top of the laying vehicle, a roller is provided on the top of the laying portion, the guiding portion is provided at the bottom of the laying vehicle, the power transmission portion is fixed outside the laying vehicle, a scroll is provided above the guiding portion, the surface of the marking tape in contact with the bridge is a rubber magnetic layer, and the other surface of the marking tape is provided with bulged reflection angles, which are used as teeth to make one end of the marking tape be connected with the roller through the teeth, and to make the other end of the marking tape be connected with the scroll through the teeth. The marking tape is installed at the bottom of the beam of the long-span bridge, and a plurality of bulges formed by the reflection angles of the marking tape are used to provide more reflection surfaces for the laser, to reduce the reflection angle, to improve the reflection effect, and then to improve the efficiency and accuracy of a three-dimensional laser scanner.

3 Claims, 3 Drawing Sheets

(58) Field of Classification Search
USPC .................... 156/60, 64, 350, 351, 378, 379
See application file for complete search history.

(56) References Cited

FOREIGN PATENT DOCUMENTS

| | | |
|---|---|---|
| CN | 204059992 U | 12/2014 |
| CN | 108222078 A | 6/2018 |
| CN | 208618687 U | 3/2019 |
| CN | 211004232 U | 7/2020 |
| CN | 211037602 U | 7/2020 |
| CN | 211369423 U | 8/2020 |
| CN | 211653129 U | 10/2020 |
| CN | 111981978 A | 11/2020 |
| CN | 112681037 A | 4/2021 |
| CN | 113005893 A | 6/2021 |
| CN | 214423091 U | 10/2021 |
| EP | 3335804 A2 | 6/2018 |
| FR | 2689151 A1 | 10/1993 |
| KR | 20190002015 A | 1/2019 |
| WO | WO-2013/159774 A2 | 10/2013 |

\* cited by examiner

AUXILIARY MARKING TAPE LAYING VEHICLE FOR LASER SCANNING OF THE MORPHOLOGY OF LONG-SPAN BRIDGE

FIELD OF TECHNOLOGY

The present invention relates to a technology for measuring and identifying the spatial morphology of a bridge, in particular to an auxiliary marking tape laying vehicle for laser scanning the morphology of a long-span bridge.

BACKGROUND

A three-dimensional laser scanner determines the spatial position of a target point in a three-dimensional spherical coordinate system by measuring the angle of emitted light and the time of reflected light in real time, and transforms it into a spatial position in a three-dimensional rectangular coordinate system. Compared with single point measurement of traditional surveying and mapping instruments, measurement of the three-dimensional laser scanner has the advantages such as a high speed and high precision. In bridge engineering, the three-dimensional laser scanner can be used to quickly obtain a point cloud on the surface of a bridge, so as to reflect the spatial geometrical morphology of the bridge.

Existing high-end three-dimensional laser scanners have a maximum range of 1 km. When scanning long-span bridges, the geometric characteristics of long and straight bridges would cause too small incident angles, and the rough and gray surface of a concrete bridge and the grayish-white surface of a steel bridge have poor reflection effect on laser, which greatly reduces the reflection intensity of the reflected laser and causes the effective range of the three-dimensional laser scanner to be greatly shortened, resulting in the loss of the target point.

With the development trend of digital bridge management and maintenance technology, the way to obtain the three-dimensional spatial information of the bridge is also faster and more accurate. Once the scanning distance is too long, there would be a technical problem that the three-dimensional data of the bottom geometrical morphology of the bridge beam cannot be collected.

SUMMARY

Purpose: in view of the above problems, the purpose of the present invention is to provide an auxiliary marking tape laying vehicle for laser scanning of the morphology of a long-span bridge. Through a laying portion, the marking tape is attached to the bottom surface of bridge beam, so as to improve the reflection surface of a three-dimensional laser scanner and further to improve the working efficiency of the three-dimensional laser scanner.

Technical solution: disclosed in the present invention is an auxiliary marking tape laying vehicle for laser scanning of the morphology of a long-span bridge, the laying vehicle comprising a laying portion, a guiding portion and a power transmission portion, wherein the laying portion is fixed on the top of the laying vehicle; a roller is provided on the top of the laying portion; the guiding portion is provided at the bottom of the laying vehicle; the power transmission portion is fixed outside the laying vehicle; a scroll is provided above the guiding portion; the surface of the marking tape in contact with the bridge is a rubber magnetic layer; and the other surface of the marking tape is provided with bulged reflection angles, which are used as teeth to make one end of the marking tape be connected with the roller through the teeth, and to make the other end of the marking tape be connected with the scroll through the teeth.

Further, the marking tape is made of a flexible material, the surface where the reflection angles are located is densely covered in white; and the shapes of the reflection angles are an equilateral triangle.

Further, the laying portion comprises a bracket; and the bracket comprises a lower plate which is horizontally arranged, and a side plate which is connected with the lower plate at an acute angle; an elastic part is fixed at the angle between the lower plate and the side plate; the roller is installed on the top of the side plate through a rotating shaft; and the lower plate is fixed on the laying vehicle through a tightening bolt.

Further, the guiding portion is connected with the bottom of the vehicle body of the laying vehicle through slots, and is fixed at the bottom of the vehicle body through bolts; the guiding portion is symmetrically arranged on both sides of the bottom of the laying vehicle; and guiding wheels are provided inside the guiding portion.

Further, the power transmission portion comprises a transmission rod and a magnet; one end of the transmission rod is fixed on the outer end face of a vehicle body through a bolt; and the other end of the transmission rod is connected with a magnet.

Further, a plurality of running wheels are symmetrically arranged at the bottom of the vehicle body; two symmetrical running wheels in the middle are connected with a gear set; the gear set is connected with the scroll which is disposed above the gear set; and the marking tape is wrapped around the scroll.

Further, the elastic part is a torsion spring.

Beneficial effects: compared with the prior art, the present invention has the following significant advantages:
1. The marking tape is installed at the bottom of the beam of the long-span bridge, and a plurality of bulges formed by the reflection angles of the marking tape are used to provide more reflection surfaces for the laser, to reduce the reflection angle, to improve the reflection effect, and then to improve the efficiency and accuracy of a three-dimensional laser scanner;
2. The marking tape is made of a flexible material and has strong plasticity, and the elastic part set in the laying portion can adjust the marking tape to closely fit the bottom of the bridge; the marking type is adsorbed on the bottom surface of the beam by a rubber magnet, which is simple and fast to install and has little influence on the whole bridge;
3. The laying vehicle has light overall weight, is easy to install on the universal beam, and moves on the universal beam through the guiding portion, which is safe and reliable, less affected by the environment, and does not hinder the movement of the recondition vehicle.

DESCRIPTION OF THE EMBODIMENTS

The present invention is further explained in combination with the accompany drawings.

Figure 1:
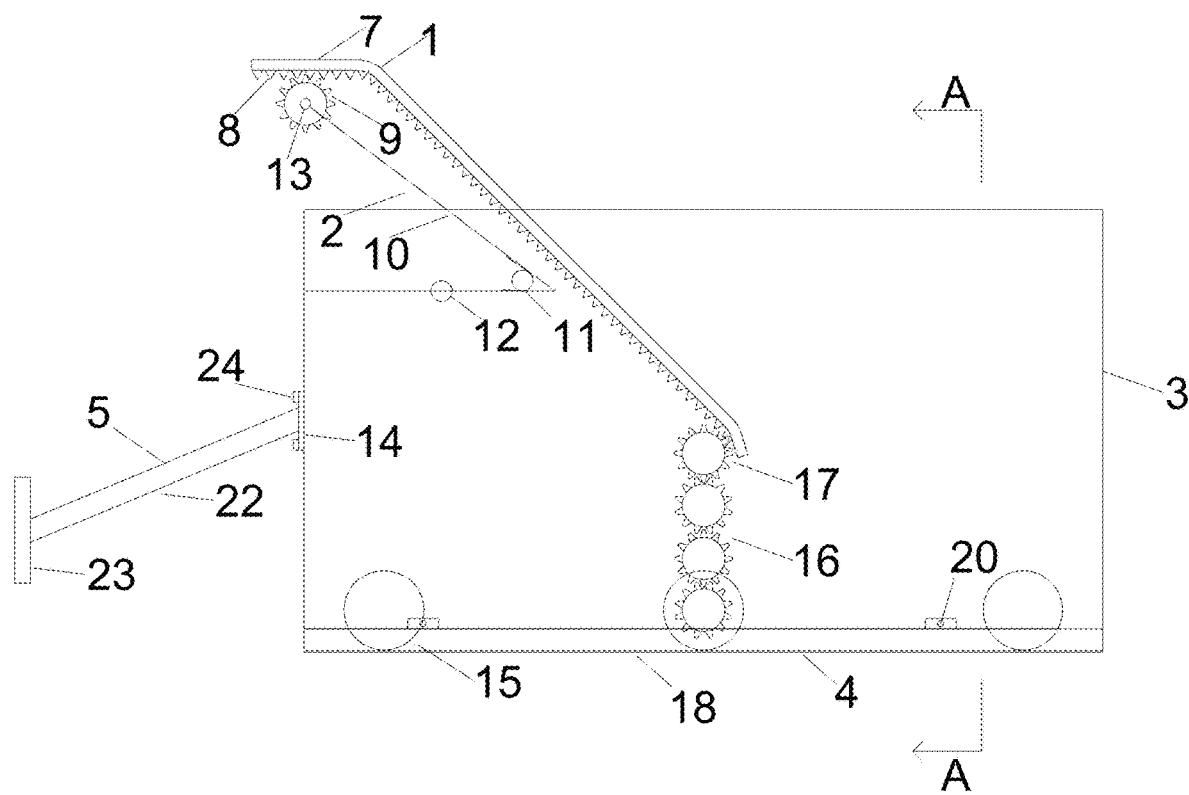
FIG. 1 shows a front view of a laying vehicle of the present invention.

A structural schematic diagram of an auxiliary marking tape laying vehicle for laser scanning of the morphology of a long-span bridge described in the present embodiment is shown as FIG. 1, and the auxiliary marking tape laying vehicle comprises a laying portion 2, a guiding portion 4 and a power transmission portion 5. The laying portion 2 is fixed on the top of the laying vehicle 3; the laying portion 2 comprises a bracket 10; the bracket 10 comprises a lower plate arranged horizontally, and a side plate connected with the lower plate at an acute angle; and a torsion spring 11 is fixed at the angle between the lower plate and the side plate; and the torsion spring 11 gives the bracket 10 an upward elastic force. A roller 9 is provided on the top of the laying portion 2; the roller 9 is installed on the top of the side plate through the rotating shaft 13; and the lower plate fixes the laying portion 2 on the laying vehicle 3 through a tightening bolt 12.

Figure 2:
FIG. 2 is a schematic diagram of the bottom structure of an auxiliary vehicle of the present invention.

The guiding portion 4 is connected with the bottom of the vehicle body 14 through slots 18, and is fixed at the bottom of the vehicle body 14 through a first bolt 20; the guiding portion 4 is symmetrically arranged on both sides of the bottom of the laying vehicle 3; guiding wheels 19 are provided inside the guiding portion 4; and the guiding wheels 19 contact with the sides of a flange plate of universal beam 6 to assist the laying vehicle 3 to move on the universal beam 6 while limiting the forward direction. Fixing bolts 21 are installed at the ends of the slots 18. When the laying vehicle 3 reaches a predetermined position, the fixing bolts 21 are used to lock it at this position, as shown in FIG. 2.

Figure 3:
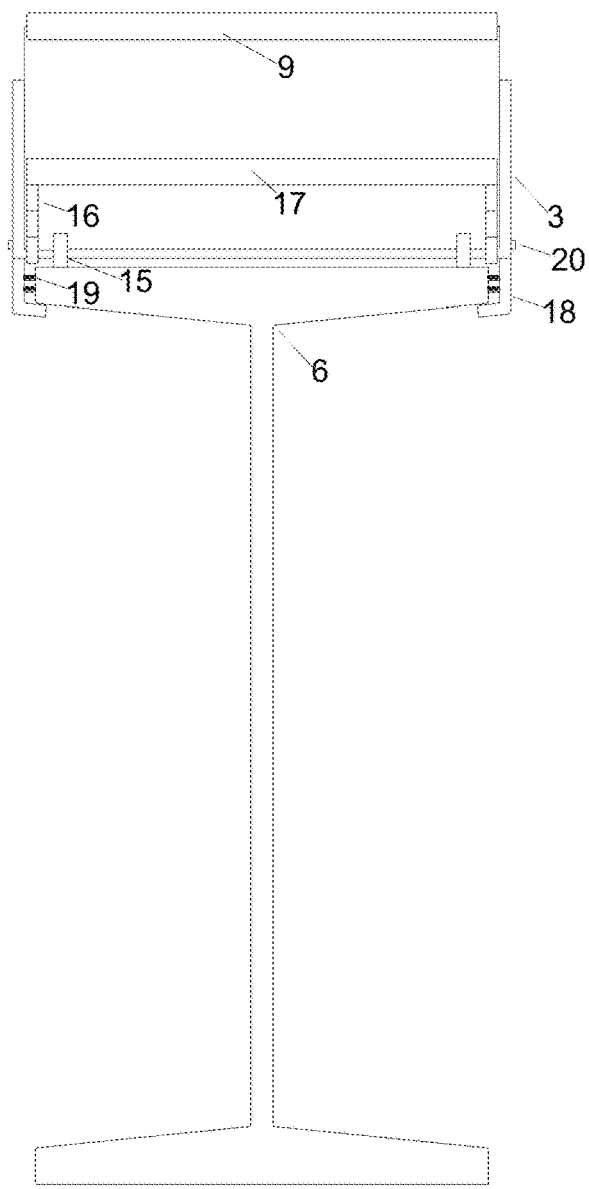
FIG. 3 shows an A-A profile when the present invention is mounted on a universal beam.
Figure 4:
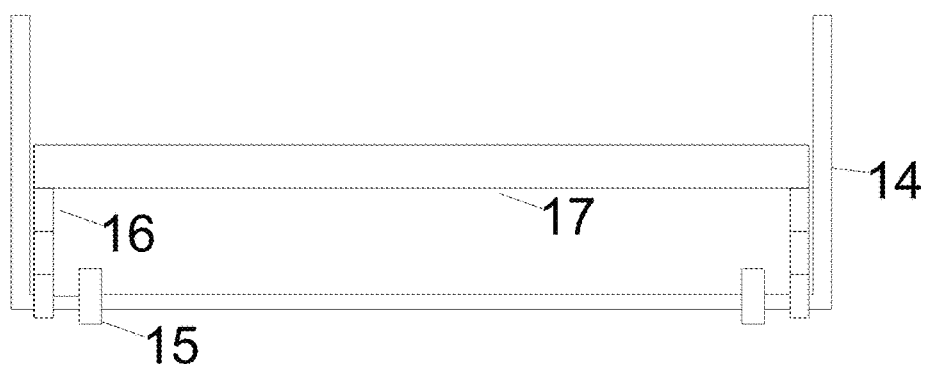
FIG. 4 is a local enlarged view of a guiding portion of the present invention.

As shown in FIG. 3 and FIG. 4, a plurality of running wheels 15 are symmetrically arranged at the bottom of the vehicle body 14 of the laying vehicle 3; the running wheels 15 are in direct contact with the universal beam 6; two symmetrical running wheels 15 in the middle are connected with a gear set 16; power is provided and transferred to the scroll 17 through the rotation of the running wheels 15; the gear set 16 is connected with the scroll 17 which is disposed above the gear set 16; and the scroll 17 is equipped with teeth for a better fit to marking tape 1. When the marking tape 1 is long, the marking tape 1 can be wrapped around the scroll 17 and placed inside the laying vehicle 3.

Figure 5:
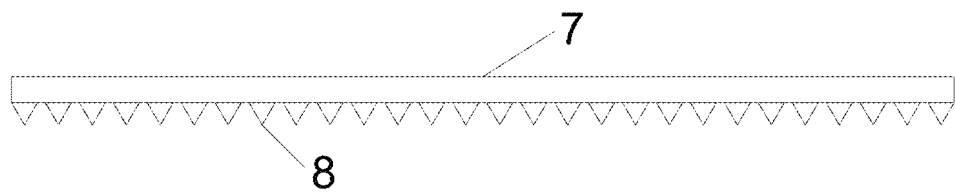
FIG. 5 is a schematic diagram of a marking tape structure of the present invention.

As shown in FIG. 5, the surface of marker tape 1 in contact with the bridge is a rubber magnetic layer 7; the marking tape 1 is adsorbed on the bottom surface of the beam through the rubber magnetic layer 7; the other surface of the marking tape 1 is provided with reflection angles 8; and the reflection angles 8 are used as teeth to make one end of the marking tape 1 be connected with the roller 9 through the teeth, and to make the other end of the marking tape 1 be connected with the scroll 17 through the teeth. The marking tape 1 is made of a flexible material; and the surface where the reflection angles 8 are located is densely covered in white. In order to make the reflection angles 8 be used as teeth and enhance the reflection effect; and the reflection angles 8 are shaped as an equilateral triangle.

The power transmission portion 5 is fixed on the exterior of laying vehicle 3; the power transmission portion 5 comprises a transmission rod 22 and a magnet 23; one end of the transmission rod 22 is fixed on the outer end face of the vehicle body 14 through a second bolt 24, and the other end of the transmission rod 22 is connected with a magnet 23; and the magnet 23 is adsorbed on the recondition vehicle to transfer power to the transmission rod 22.

In a practical application of a long-span bridge beam scanning project:

The laying vehicle 3 is installed on the bottom plate of the beam of the long-span bridge and the universal beam 6 of the recondition vehicle track beam, and moves along the universal beam 6 so as to lay the marking tape 1 to the bottom plate of the beam, which greatly improves the scanning range of a three-dimensional laser scanner for the spatial morphology of the long-span bridge.

Wherein, the marking tape 1 is a combination tape of rubber magnetic 7 and reflection angles 8 with a width of 15 cm. One side of marking tape 1 is the rubber magnetic 7 with a thickness of 0.2 cm. The surface of the other side of marking tape 1 is covered with the reflection angles 8 of an equilateral triangle with a side length of 0.2 cm. The marking tape 1 with a total length of 100 m is wrapped around the scroll 17.

When the laying vehicle 3 is attached with the marking tape 1, first of all, on the universal beam 6 next to the recondition vehicle at the bridge bottom, the slots 18 in the guiding portion 4 are stuck on the universal beam 6 of the track beam of the long-span bridge beam bottom plate recondition vehicle, and the vehicle body 14 of the laying vehicle 3 is connected with the slots 18 through bolts; the marking tape 1 is wrapped around the scroll 17 and then put inside the laying vehicle 3, the bracket 10 of laying portion 2 is installed on the upper part of laying vehicle 3 through the tightening bolt 12, the power transmission portion 5 is installed outside the vehicle body 14 through the second bolt 24, the other end of the transmission rod 22 is connected with the recondition vehicle through the magnet 23, the recondition vehicle transfers the power to the transmission rod 22 through the magnet 23 so as to drive the running wheels 15 of laying vehicle 3 to move along the universal beam 6, and the gear set 16 connected with the running wheels 15 drives the scroll 17 to rotate, the marking tape 1 and the roller 9 of laying portion 2 move together, and, under the action of the upward elastic force of the torsion spring 11, the laying portion 2 closely fits the marking type 1 at the bottom of the bridge.

The working principle that the above auxiliary target can realize the remote accurate scanning of the beam at the bottom of the bridge body is as follows: because the smooth and white marking tape made of plastic has the best reflection effect on the laser, the laser reflection intensity is enhanced. At the same time, the dense small bulges on the surface of the marking tape give the laser a large number of reflection surfaces with smaller incident angles, which makes the laser emitted by the three-dimensional laser scanner more likely to be received by an instrument with higher reflection intensity. The small bulges are closer to the bottom of the bridge, which also reduces the scanning error.

The invention claimed is:

1. An auxiliary marking tape laying vehicle for laser scanning of a morphology of a long-span bridge, the laying vehicle comprising a laying portion, a guiding portion and a power transmission portion, wherein the laying portion is fixed on a top of the laying vehicle; a roller is provided on a top of the laying portion; the guiding portion is provided at a bottom of the laying vehicle; the power transmission portion is fixed outside the laying vehicle; a scroll is provided above the guiding portion; a surface of the marking tape in contact with the bridge is a rubber magnetic layer;

and an other surface of the marking tape is provided with bulged reflection angles, which are used as teeth to make one end of the marking tape be connected with the roller through the teeth, and to make an other end of the marking tape be connected with the scroll through the teeth;

the laying portion comprises a bracket; and the bracket comprises a lower plate which is horizontally arranged, and a side plate which is connected with the lower plate at an acute angle; an elastic part is fixed at an angle between the lower plate and the side plate; the roller is installed on a top of the side plate through a rotating shaft, and the lower plate is fixed on the laying vehicle through a tightening bolt;

the guiding portion is connected with a bottom of a vehicle body through slots, and is fixed at the bottom of the vehicle body through a first bolt; the guiding portion is symmetrically arranged on both sides of the bottom of the laying vehicle; and guiding wheels are provided inside the guiding portion;

a plurality of running wheels are symmetrically arranged at the bottom of the vehicle body; two symmetrical running wheels in a middle are connected with a gear set, and the gear set is connected with the scroll which is disposed above the gear set; and the marking tape is wrapped around the scroll, wherein the marking tape is made of a flexible material, the surface where the reflection angles are located is densely covered in white; and the shapes of the reflection angles are an equilateral triangle.

2. The auxiliary marking tape laying vehicle for laser scanning of the morphology of a long-span bridge according to claim 1, wherein the power transmission portion comprises a transmission rod and a magnet, one end of the transmission rod is fixed on an outer end face of the vehicle body through the first bolt, and an other end of the transmission rod is connected with a magnet.

3. The auxiliary marking tape laying vehicle for laser scanning of the morphology of a long-span bridge according to claim 1, wherein the elastic part is a torsion spring.

* * * * *